(12) United States Patent
Villalpando et al.

(10) Patent No.: US 12,367,610 B2
(45) Date of Patent: Jul. 22, 2025

(54) FIELD PROGRAMMABLE GATE ARRAY (FPGA) ACCELERATION FOR SCALE AND ORIENTATION SIMULTANEOUS ESTIMATION (SOSE)

(71) Applicant: California Institute of Technology, Pasadena, CA (US)

(72) Inventors: Carlos Young Villalpando, Altadena, CA (US); Ashot Hambardzumyan, Porter Ranch, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 303 days.

(21) Appl. No.: 18/158,721

(22) Filed: Jan. 24, 2023

(65) Prior Publication Data

US 2023/0237698 A1 Jul. 27, 2023

Related U.S. Application Data

(60) Provisional application No. 63/302,204, filed on Jan. 24, 2022.

(51) Int. Cl.
*G06T 7/73* (2017.01)
*G01C 21/00* (2006.01)
(Continued)

(52) U.S. Cl.
CPC .............. *G06T 7/74* (2017.01); *G01C 21/005* (2013.01); *G06T 1/20* (2013.01); *G06T 7/13* (2017.01);
(Continued)

(58) Field of Classification Search
None
See application file for complete search history.

(56) References Cited

U.S. PATENT DOCUMENTS

| 2015/0254075 A1* | 9/2015 | Ng | G06F 9/445 712/220 |
| 2017/0154429 A1* | 6/2017 | Moteki | G06T 7/74 |
| 2019/0037207 A1* | 1/2019 | Brockers | H04N 13/117 |

OTHER PUBLICATIONS

Lowe, D.G., "Distinctive Image Features from Scale-Invariant Keypoints", International Journal of Computer Vision, 2004, pp. 91-110, vol. 60, No. 2.

(Continued)

*Primary Examiner* — Vivek D Koppikar
*Assistant Examiner* — David Ruben Pedersen
(74) *Attorney, Agent, or Firm* — Gates & Cooper LLP

(57) ABSTRACT

A system provides descriptor-based feature matching during terrain relative navigation (TRN). A scale and orientation (SO) module acquires a source image, image and slope pixel windows, and ring mask. The SO module combines corresponding pixels from the image pixel window and the slope pixel window to generate intermediate values, accumulates the intermediate values into ring accumulators, sums the accumulated values to generate a final ring value, and determines an orientation stability measure, and final scale and orientation values. An extract descriptors (ED) module acquires the source image, the image and slope pixel windows, final scale and orientation values, sector values, and a rink mask value. The ED module identifies pixels of interest, reorients the sector values. combines corresponding pixels from the image pixel window and the slope pixel window, accumulates and normalizes the intermediate values, and generates an image feature descriptor per coordinate.

20 Claims, 12 Drawing Sheets

(51) Int. Cl.
*G06T 1/20* (2006.01)
*G06T 7/13* (2017.01)

(52) U.S. Cl.
CPC ...... *G06T 7/73* (2017.01); *G06T 2207/10032* (2013.01)

(56) References Cited

OTHER PUBLICATIONS

Rosin, P.L., "Measuring Corner Properties", Computer Vision and Image Understanding, 1999, pp. 291-307, vol. 73, No. 2.
Bay, H., et al., "SURF: Speeded Up Robust Features", ECCV 2006, Part I, LNCS 3951, 2006, pp. 404-417.
Koenderink, J.J., "The Structure of Images", Biological Cybernetics, 1984, pp. 363-370, vol. 50.
Lindeberg, T., "Scale-space theory: A basic tool for analysing structures at different scales", Journal of Applied Statistics, 1994, pp. 224-270, vol. 21, No. 2.
Mikolajcyk, K., et al., "An affine invariant interest point detector", 7th European Conference on Computer Vision (ECCV '02), May 2002, pp. 128-142.
Rublee, E., et al., "ORB: an efficient alternative to SIFT or SURF", ICCV, 2011, pp. 2564-2571.
Alcantarilla, P.F., et al., "KAZE Features", ECCV 2012, pp. 214-227.
Mikolajcyk, K., et al., "Scale & Affine Invariant Interest Point Detectors", International Journal of Computer Vision, 2004, pp. 63-86, vol. 60, No. 1.
Owens, C., et al., "Development of a Signature-based Terrain Relative Navigation System for Precision Landing", AIAA SciTech Forum, Jan. 2021, pp. 1-20.
Agrawal, M., et al., "CenSurE: Center Surround Extremas for Realtime Feature Detection and Matching", ECCV 2008, Part IV, LNCS 5305, pp. 102-115.

\* cited by examiner

FIELD PROGRAMMABLE GATE ARRAY (FPGA) ACCELERATION FOR SCALE AND ORIENTATION SIMULTANEOUS ESTIMATION (SOSE)

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 63/302,204, filed on Jan. 24, 2022, with inventor(s) Carlos Y. Villalpando and Ashot Hambardzumyan, entitled "FPGA Acceleration of the Scale and Orientation Simultaneous Estimation (SOSE) Algorithm,".

This application is related to the following co-pending and commonly-assigned patent application, which application is incorporated by reference herein:

U.S. patent application Ser. No. 17/818,634, filed on Aug. 9, 2022, which issued Mar. 4, 2025 as U.S. Pat. No. 12,242,833 with inventor(s) Yang Cheng and Adnan I. Ansar, entitled "Simultaneous Orientation and Scale Estimator (SOSE),", which application claims the benefit under 35 U.S.C. Section 119(e) of the following co-pending and commonly-assigned U.S. provisional patent application(s), which is/are incorporated by reference herein: Provisional Application Ser. No. 63/230,940, filed on Aug. 9, 2021, with inventor(s) Adnan I Ansar and Yang Cheng, entitled "Block-wise Outlier Rejection Scheme for Efficient Image to Map Matching,".

STATEMENT REGARDING FEDERALLY SPONSORED RESEARCH AND DEVELOPMENT

This invention was made with government support under Grant No. 80NMO0018D0004 awarded by NASA (JPL). The government has certain rights in the invention.

BACKGROUND OF THE INVENTION

1. Field of the Invention

The present invention relates generally to vision-based perception for any robotic system, focusing on but not limited to spacecraft landing and navigation, and in particular, to a method, system, apparatus, article of manufacture, and a field programmable gate array for accelerating the estimation of feature scale and orientation for terrain mapping for spacecraft navigation and landing.

2. Description of the Related Art (Note: This application references a number of different publications as indicated throughout the specification by reference names enclosed in brackets, e.g., [Smith]. A list of these different publications ordered according to these reference names can be found below in the section entitled "References." Each of these publications is incorporated by reference herein.)

Terrain relative navigation (TRN) has become an important capability for spacecraft to land precisely on another planetary body. An onboard TRN system carries a premade terrain map of a landing site (referred to as a reference map) and then a descent image (e.g., captured via an onboard camera) is matched to the reference map to estimate the spacecraft pose (both attitude and position). Such a matching is often based on matching features from both images (referred to as feature matching).

Under normal conditions, the spacecraft attitude and altitude are known due to on-board instruments such as the IMU (inertial measurement unit), star tracker and altimeter. When a partial spacecraft pose is known, the TRN algorithms can be greatly simplified. For example, if the attitude and altitude are known, a feature's scale and orientation may be easily determined, thereby dramatically reducing the search scope during feature matching. Furthermore, if the attitude is known, outlier rejection may be computed by a simple triangulation approach where only two features are needed for a position estimation. However, when such information is absent, the problem becomes more complicated. To better understand such problems, an explanation of prior art feature matching may be useful.

Since David Lowe published his paper on the Scale-Invariant Feature Transform (SIFT) [Lowe], descriptor-based feature matching has become a standard in computer vision and beyond. SIFT leverages earlier work in scale-space theory [Koenderink][Lindeberg] to define scale-stable key-points in an image as extrema in a representation of the image formed by convolution with a bank of difference of Gaussian kernels separated by a fixed scale factor. Extrema in this Difference of Gaussian (DoG) space approximate extrema of the scale-normalized Laplacian of Gaussian, which was previously shown [Lindeberg][Mikolajcyk] to produce scale-invariant key-points. Since Lowe's work, many descriptor-based feature recognition algorithms have been produced. These include computational simplifications to SIFT, such as SURF [Bay], novel types of descriptors (ORB [Rublee]) and modifications to the scale-space formalism (KAZE [Alcantarilla]), as well as many others.

A common drawback of descriptor-based approaches for efficient hardware implementation is that they use image pyramids or banks of image convolutions to model a scale-space representation. Random data access in the process of exhaustive search in scale-space is not amenable to parallelization or FPGA (field programmable gate array) implementation. However, if the scale-space representation scheme is simplified, these approaches typically suffer from poorer performance in scale-invariance.

Further to the above, an attempted implementation in FPGA may encounter additional problems such as what actions to perform in parallel, what actions to perform in a pipeline fashion, how and what to read/write from/to memory, etc. In view of the above, what is needed is a descriptor-based feature matching approach that is implemented in FPGA.

SUMMARY OF THE INVENTION

Embodiments of the invention provide a novel implementation of a field programmable gate array (FPGA) that accelerates the processing of image data via a scale and orientation simultaneous estimation (SOSE) methodology that is used to perform terrain mapping for spacecraft navigation and landing. In particular, a scale and orientation (SO) module includes an SO memory read/write engine that feeds a three stage SO computation pipeline. The SO memory read/write engine reads in various data for the source image and slope image. In a first stage, the SO computation engine sums/accumulates relevant window coordinate data (from the source and slope images) into ring accumulators. The second stage presents a ring address to the first stage and runs through all possible ring radii (e.g., thereby triggering the repeat of the first stage summing/accumulating for each ring). The third stage presents a ring address to the second stage and computes scale and orientation values.

An extract descriptor (ED) module includes an ED memory read/write engine that feeds a three-stage ED computation pipeline performed by an ED computation engine. The ED memory read/write engine reads in coordinates, the scale and orientation values (from the SO module) and fetches a pixel window about each coordinate from the source image and the Sobel DX/DY image. The pixel data and values from a sector and ring mask are fed to the ED computation engine. The first ED stage computes partial sector sums. The second ED stage sums up remaining vectors and outputs the square root of the sum of sums to begin normalizing the vector. The third ED stage re-reads the partial sums and divides by the vector length to complete the normalization of the vector. The descriptors generated via the normalization are then written out to memory.

In addition to the above, a Brute Force (BF) Matcher may be used to compare two sets of descriptors to find the best match between them (e.g., using a Manhattan Distance method).

Further, a Harris feature detector of embodiments of the invention may begin with a Harris corner detector methodology with added non-maxima suppression. Such steps are followed by padding all outputs with zeros to be the same size as a subwindow selected and establishing a keepout zone by setting all R scores (i.e., the response score of the Harris corner detector) within a predefined range of the border to zero (i.e., to prevent the system from picking features too close to the border).

BRIEF DESCRIPTION OF THE DRAWINGS

Referring now to the drawings in which like reference numbers represent corresponding parts throughout.

DETAILED DESCRIPTION OF THE INVENTION

Figure 1:
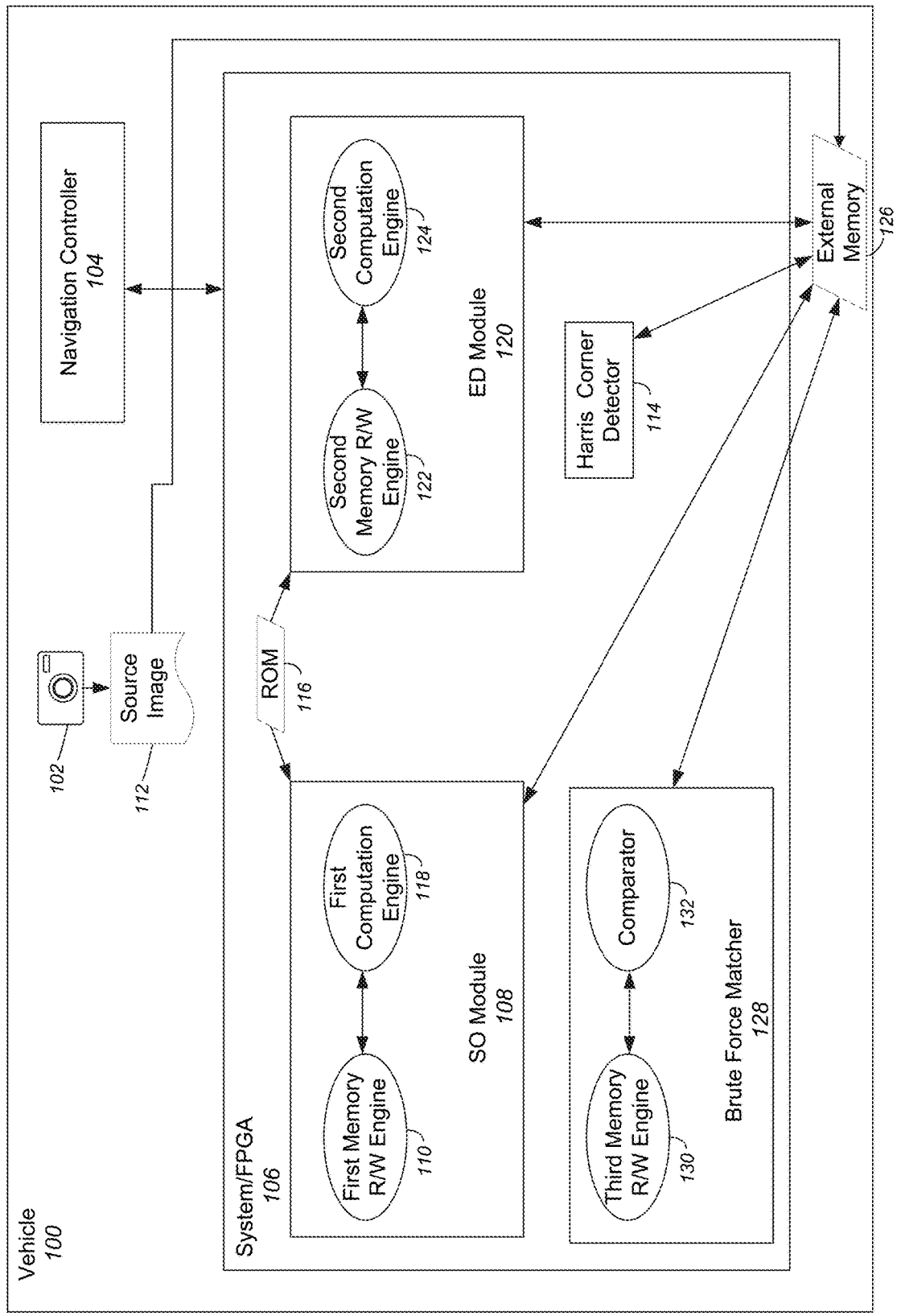
FIG. 1 illustrates an exemplary system/FPGA and logical flow for descriptor-feature based matching during terrain relative navigation (TRN) in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Simultaneous Orientation and Scale Estimator (SOSE)

Embodiments of the invention provide a novel approach that can estimate feature scale and orientation in a single image layer, which means the detailed scale representation, which may be essential for good performance of most other algorithms, becomes unnecessary.

Ongoing missions and projects such as the Mars Sample Return (MSR) mission, the lunar lander or human missions rely on terrain relative navigation (TRN) to land precisely at a targeted area. SOSE provides a critical capability of TRN. Current TRN algorithms rely on altimeter readings such as TDS (terminal descent sensor) to provide scale information for feature matching. SOSE estimates the scale quickly and reliably, and as a result, SOSE can replace the TDS, which is a heavy and power-hungry instrument. To save or reduce the spacecraft mass is critically important for MSR missions.

Single Level Orientation and Scale Estimation

Descriptor based feature matching can be divided into three steps: (1) feature detection; (2) descriptor construction; and (3) descriptor matching.

A feature detected by feature detection is a small image patch, such as such as a corner, extrema (peak or minima), or a small topographic feature, such as crater, boulder, etc., which contains a unique signature that differs from other image patches in the same or different scale. The scale and orientation of detected features are then determined. Finally, certain signatures are taken from a region centered on a local feature using the estimated scale and orientation, and converted into descriptors. The image signatures commonly considered are intensity, color, texture and gradience, etc. A feature descriptor's performance under any possible variations (scale, orientation, perspective distortion, lighting, etc.) is dependent on the following properties: (a) repeatability; (b) accuracy and locality; (c) invariance and its sensitivity; and (d) efficiency. Details for each of these properties follow.

Repeatability: Given two images of the same object or scene, taken under different viewing conditions, a high percentage of the features (from the scene) should be found in both images. Under a particular definition of feature type, the number of features in an image could be from a limited number to an infinite number. For example, the number of visible topographic feature such as craters, or boulders in a piece of Mars or the Moon terrain is limited. In this case, the repeatability is defined as how well an algorithm can detect these topographic features. On the other hand, some features may be loosely defined as some type/kind of a corner such as a Harris corner. In this regard, the number of features could vary greatly depending on the threshold used to define the features. In one or more embodiments, only the top N "best" features are selected. However, the feature "goodness", which is typically a measure intrinsically tied to the feature detection method, is not always viewing and scale invariant, and therefore the features' "goodness" could vary from image to image and the repeatability of the features may suffer. Accordingly, one or more embodiments of the inventions detect a sufficiently large number of features, so that a reasonable number of features are detected in both images such that a sufficient number of matched features can be determined in the subsequent steps. However, too many features could slow down the process. Ideally, the number of detected features may be adaptable over a large range by a simple and intuitive threshold. The density of features should reflect the information content of the image to provide a compact image representation. The optimal feature density depends on mission requirements, on board compute resources, scene content, etc. This number is usually derived using a combination of simulations and formal data analysis.

Accuracy and locality: The detected features should be accurately localized in both images with respect to scale, and possibly viewing angle as well as translation. An extensive study about various feature detection accuracies under different variations shows most of the algorithms have about 1~3 pixels error. Some of the attempts to improve the feature location by subpixel interpolation or affine approximation only resulted in a very limited improvement. A 1 to 3 pixel position error could potentially alter the image patch properties such as the orientation as well as the signature, thereby ultimately causing a feature matching failure. Because improving the feature selection accuracy is very difficult, mitigating or reducing the impact of the inaccurate features may be desirable.

Invariance and its sensitivity: One potentially critical computation for a descriptor feature is to determine the feature's invariance properties such as the scale and orientation under different scale and viewing angles. SIFT uses image pyramids or convolutions with banks of scale-dependent kernels to estimate a feature scale. Another prior art algorithm uses Harris/Hessian corners with different Laplace kernels to estimate the feature scale. Most of the prior art algorithms involve multi-level data layers and three dimensional (3D) searching (two spatial dimensions and one scale dimension). As a result, such prior art schemes require a large volume of memory space to store the data layers. Further, 3D searching may involve significant random memory access which is prohibitively expensive—particularly for FPGA hardware implementations. Other algorithms such as STAR, a computationally efficient variant of the Center Surround Extremas (CenSurE) algorithm [Agrawal], directly use the homogeneous regions (blocks) as scale measurements. However, such algorithms work only in the scene where sufficient homogeneous blocks exist and which unfortunately is not always the case.

Efficiency: In one or more embodiments, the detection of features in a new image allows for time-critical applications. An algorithm that uses smaller memory space and has less random memory access will be beneficial for improving the execution speed.

Embodiments of the invention may focus on the efficiency improvement by eliminating multi-level data layers and most random memory access operations in the key point scale and orientation estimation.

System/FPGA Overview

Embodiments of the invention include a system that is implemented in an FPGA that processes images via descriptor-based feature matching during terrain relative navigation (TRN). Components of the system include a scale and orientation (SO) module and an extract descriptors (ED) module. These modules work together during TNR such that a spacecraft can navigate based on the feature mapping. The descriptions below provide an overview of the system followed by details for each of the modules and the computations performed therein.

FIG. 1 illustrates an exemplary system/FPGA and logical flow for descriptor-feature based matching during terrain relative navigation (TRN) in accordance with one or more embodiments of the invention. The logical flow for performing such matching is reflected by the arrows as described below.

In general, a spacecraft/vehicle 100 includes various components (amongst other components not shown) including a camera 102, navigation controller 104 (to control and navigate the vehicle 100 based on the feature mapping during TRN), and a system/FPGA 106.

Within the FPGA 106 is a scale and orientation (SO) module 108. The SO module 108 includes a first memory read/write engine 110 that feeds a first multi-stage computation pipeline. The first memory read/write engine 110 performs a set of actions including that includes:

(1) reading in image coordinates for a source image 112 captured by the camera 102 from the vehicle 100 above a terrain of a scene (i.e., from external memory 126 where the source image is stored);

(2) fetching an image pixel window from the source image 112 around each of the image coordinates;

(3) fetching a slope pixel window from a slope image around each of the image coordinates—the slope image is generated by a Harris corner detector 114, and the slope image is based on the source image 112 (and the slope image is stored by the Harris corner detector 114 in external memory 126);

(4) fetching a ring mask from a read only memory (ROM) 116; and (5) feeding the image pixel window, the slope pixel window, and the ring mask value to a first computation engine 118.

The first computation engine 118 performs two or more primary stages in parallel in a pipeline fashion. A first primary stage of the two or more primary stages (a) combine corresponding pixels from the image pixel window and the slope pixel window with subwindow coordinates to generate intermediate values for each subwindow coordinate and (b) accumulate the intermediate values into ring accumulators based on the ring mask.

A second primary stage of the two or more primary stages: (a) read the accumulated intermediate values from the ring accumulators, and (b) sum the accumulated intermediate values for each ring accumulator to generate a final ring value for each ring accumulator.

A third primary stage of the two or more primary stages provide for performing multiple computations in parallel, and all of the computations are of a same latency. Each computation is utilized to determine an orientation stability measure for each ring accumulator. Each orientation stability measure is used to determine a final scale value and a final orientation value based on a threshold for the orientation stability measure. The final scale value is based on a first inner ring accumulator of the ring accumulators where the threshold was met. The final orientation value is based on the accumulated intermediate values corresponding to the first inner ring accumulator where the threshold was met. The final scale value and final orientation value are written in the first memory read/write engine 108.

The extract descriptors (ED) module 120 includes a second memory read/write engine 122 and a second computation engine 124.

The second memory read/write engine 122 feeds a second multi-stage computation pipeline. To feed the second multi-stage computation pipeline, the second memory read/write engine 122 performs the following steps:

(1) reads in the image coordinates for the source image 112 captured by the camera 102 from the vehicle 100 above the terrain of the scene (i.e., from external memory 126);

(2) fetches the image pixel window from the source image 112 around each of the image coordinates;

(3) fetches the slope pixel window from the slope image around each of the image coordinates, wherein the slope image is generated by the Harris corner detector 114 (and stored in external memory 126), and wherein the slope image is based on the source image 112;

(4) reads the final scale value and the final orientation value for each of the image coordinates from external memory 126 wherein the final scale value and the final orientation value were generated by the scale and orientation module 108;

(5) fetches sector values and a ring mask value from the ring mask from the read only memory (ROM) 116;

(6) feeds the image pixel window, the slope pixel window, the sector values, the ring mask value, the final scale value, and the final orientation value to the second computation engine 124;

(7) identifies pixels of interest based on the final scale value and the ring mask value for a current image coordinate of the image coordinates; and (8) reorients the sector values based on the final scale value and the final orientation value.

The second computation engine 124 performs two or more secondary stages in parallel in a pipeline fashion. A first secondary stage of the two or more secondary stages includes (a) combining corresponding pixels from the image pixel window and the slope pixel window with subwindow coordinates to generate intermediate values for each subwindow coordinate, and (b) accumulating the intermediate values into sector accumulators associated with the reoriented sector values.

Additional secondary stages of the two or more secondary stages include (a) normalizing the intermediate values in the sector accumulators to generate an image feature descriptor per coordinate, and (b) writing the image feature descriptors into external memory 126. In one or more embodiments, the normalizing is based on an integer square root to calculate a vector length of an n-dimensional vector based on the intermediate values in the sector accumulators.

The image feature descriptors are used to perform the feature matching during the terrain relative navigation (TRN).

In one or more embodiments, the system/FPGA 106 may also include a Brute Force (BF) Matcher 128. The BF Matcher 128 includes a third memory read/write engine 130 and a comparator 132.

The third memory read/write engine 130:

(1) pre-loads a set of map feature descriptors from the image feature descriptors into an on-chip cache;

(2) loads a single reference image feature descriptor generated from the source image 110 on a per inner loop cycle;

(3) waits until the on-chip cache is full or the set of map feature descriptors is exhausted; and (4) waits for the comparator 130 to complete a comparison for the inner loop cycle for all map feature descriptors in the set.

The comparator 132 (a) compares the single reference image feature descriptor to the set of map feature descriptors that are in the on-chip cache to determine a result (wherein the result comprises a correspondence between the single reference image feature descriptor and the map feature descriptors in the set of map feature descriptors), and writes the result to external memory 126.

In one or more embodiments, the comparator 132 compares the single reference image feature descriptor to the set of map feature descriptors based on Manhattan distance based on a summation of absolute differences. Further, in one or more embodiments, the comparator 132 performs an outer loop cycle by: (a) triggering the third memory read/write engine 130 to read the result for the single reference image feature descriptor; (b) triggering the third memory read/write engine 130 to load another single reference image feature descriptor and repeating the compare using the another single reference image feature descriptor and the set to generate a new result; (c) combining the result and the new result; and (d) writing the combined results to the off-chip/external memory 126.

In one or more embodiments, the Harris corner detector 114 may be configured to perform various steps. Such steps may include the following:

(a) computing X and Y derivatives of the source image 112;

(b) computing multiple products of the derivatives;

(c) computing a window sum of the multiple products;

(d) computing a Harris corner response score of the Harris corner detector (R Score), wherein the R Score comprises multiple R score values based on the window sum of the multiple products;

(e) computing a non-maxima suppression within a predefined window to detect a local maximum, wherein the local maximum is utilized to select feature coordinates;

(f) padding the X and Y derivatives and the R score with zeros to be a same size as the source image 112;

(g) setting the R score values within a predefined pixel range of a border of the R score to zero; and (h) outputting the slope image, wherein the slope image comprises the X and Y derivatives and the R score.

In one or more embodiments, the Harris corner detector 114 computes the X and Y derivatives using a Sobel*Gaussian kernel. Further, in one or more embodiments, the Harris corner detector 114 computes the window sum of the multiple products utilizing a preexisting module with a multiplier set to 1. In such embodiments, the preexisting module turns a convolution operation into a window sum operation that computes the window sum, and a synthesizer (e.g., on vehicle 100) removes the multiplier.

Further to the above, in one or more embodiments, only a Harris corner response score that is positive is utilized to determine corners.

As described above, each of the modules (i.e., SO module 108, ED module 120, Harris Corner detector 114, and Brute Force Matcher 128) retrieve/obtain their data from external memory 126 and put/store their output products there.

Further details regarding each of the above elements and steps follow.

Scale/Orientation (SO) Computation

Computation Description

The Scale/Orientation (SO) module 108 computes the Scale and Orientation value of an image patch about a selected feature given the (source) image 112, and its Harris/Sobel gradient image. Orientation of an image patch is defined in terms of its first order moments. Those moments of a patch $m_{pq}$ are defined as:

$$m_{pq} = \sum_{x,y} x^p y^q I(x, y) \quad [1]$$

where x is column distance to the patch center, y is row distance to the patch center and I(x,y) is image intensity.

The Intensity Centroid (IC), analogous to an intensity-derived center of mass, of the patch is given by:

$$IC = (m_{01}/m_{00}, m_{10}/m_{00})$$

where $m_{mn}$ is defined by Eq. 1.

It follows that a natural orientation for the patch is then given by the angle between the patch center and the IC:

$$\theta = a \tan 2(m_{01}, m_{10}) \quad [2]$$

Assuming an image patch is rotated by an angle α, a pixel (x, y) in the rotated patch will be $$x' = x \cos \alpha - y \sin \alpha$$

$$y' = x \sin \alpha + y \cos \alpha \quad [3]$$

Substitute Eq. 3 into Eq. 2, we find after simplification that the newly estimated orientation of the rotated patch is $$\theta' = a \tan 2(m_{01}', m_{10}') = \theta + \alpha \quad [4]$$

In addition, the IC is scale invariant since if the image is scaled by a factor s as x'=sx and y'=sy, the θ keeps/remains constant.

The IC is not always stable spatially, the SO module 108 must take care of applying the correct thresholds to make sure the computed scale and orientation values are truly converged. To determine when it is converged, embodiments of the invention may perform additional computations. In this regard, identification of a moment when the orientation is relative stable spatially and radially will lead to a stable and accurate orientation estimation.

The partial derivative over x, y of Eq. (2) is $$\frac{\partial \theta}{\partial x} = \frac{1}{1 + \tan^2 \theta} \quad [5]$$

$$\left( \frac{\sum (I + xI_x) \sum yI - \sum yI_x \sum xI}{\left(\sum yI\right)^2} \right)$$

$$\frac{\partial \theta}{\partial y} = \frac{1}{1 + \tan^2 \theta}$$

$$\left( \frac{\sum I_y \sum yI - \sum xI \sum (I - yI_y)}{\left(\sum yI\right)^2} \right)$$

The orientation stability measure ($M_1$) may be defined at P(x, y) as $$M_1(r) = \left[ \left(\frac{\partial \theta}{\partial x}\right)^2 + \left(\frac{\partial \theta}{\partial y}\right)^2 \right] \quad [6]$$

$$(x^2 + y^2) < r^2$$

For any given point, one would like to find r so that $M_1(r)$ is close to zero, $$M_1(r) < t \quad [7]$$

where t is a threshold. Since $M_1(r)$ is close to zero, the orientation is locally approximated by a constant, hence the orientation of a patch is stable spatially within a radius r of the patch center. For example, if P is moved slightly, dP(dx, dy), the new orientation is then $$\theta' = \theta + \frac{\partial \theta}{\partial x} dx + \frac{\partial \theta}{\partial y} dy \approx \theta \quad [8]$$

On the other hand, one may also define another matrix, so the IC will be stable radially as $$M_2(r) = \quad [9]$$

$$\tan(\theta(r) - \theta(r + dr)) = \tan\left( \arctan\left( \frac{\sum_r IX}{\sum_r IY} \right) - \arctan\left( \frac{\sum_{r+dr} IX}{\sum_{r+dr} IY} \right) \right) =$$

$$\frac{\sum_r IX \sum_{r+dr} IY - \sum_r IY \sum_{r+dr} IX}{\sum_r IX \sum_{r+dr} IX + \sum_r IY \sum_{r+dr} IY} < d\theta$$

Then one defines the scale S at point P as the radius r when $M_1$ and $M_2$ are smaller than their thresholds.

Figure 2:
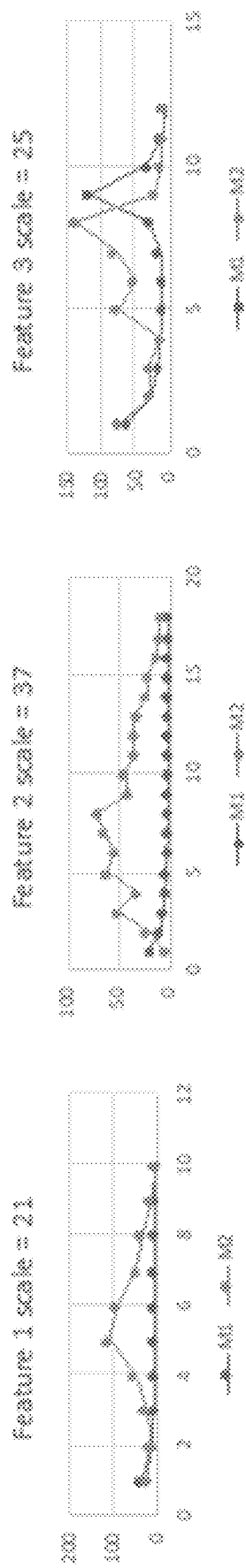
FIG. 2 shows curves of partial derivative over r in accordance with one or more embodiments of the invention.

To find the scale r, one can start with a small circle (Eq. (7)) and then increase the radius until $M_1$ and $M_2$ (Eq. (6)) stabilizes. This gives both the scale of the point and a stable orientation from the IC computed over a radius r. FIG. 2 shows curves of partial derivative over r in accordance with one or more embodiments of the invention. When M1 and M2 move close to zero, the IC orientation is stable spatially and radially and the radius of this moment is then used as the scale of this feature. As illustrated, the scale converges at different speeds dependent on the local texture properties. In high texture areas, it converges faster than at low texture areas. Such behavior is very similar to other scale estimators.

SO Module 108 Overview

Figure 3:
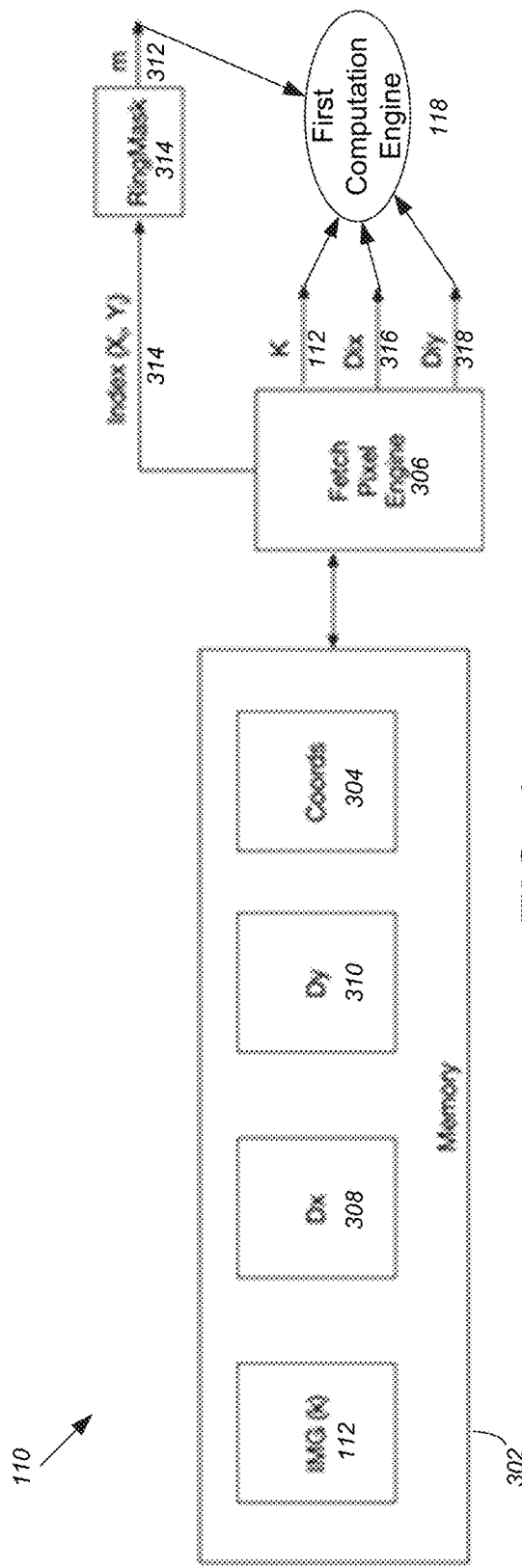
FIG. 3 illustrates an exemplary scale and orientation (SO) memory engine in accordance with one or more embodiments of the invention.

The S/O module 108 contains a memory read/write engine 110 feeding a three-stage computation pipeline. FIG. 3 illustrates an exemplary SO memory engine 110 in accordance with one or more embodiments of the invention. The memory read/write engine 110 reads (from memory 302) in coordinates 304, and fetches a 51×51 pixel window (i.e., from fetch pixel engine 306) about each coordinate 304 from the source image 112, and Sobel DX/DY image (308/310) (e.g., generated by the Harris corner detector 114)(the DX/DY image is the slope image and the Dix 316 and Diy 318 is the subwindow within the slope image corresponding to the index $(x_i, y_i)$ 314 (that includes xi coordinate 314X and yi coordinate 314Y). Memory read/write engine 110 feeds those pixels (from the source image K 112 and the slope image corresponding to the pixel window 316-318), along with values (m) 312 from a sector and ring mask ROM 314 corresponding to the subwindow location (i.e., identified by the index $(x_i, y_i)$ 316) to the computation engine 118.

Figure 4:
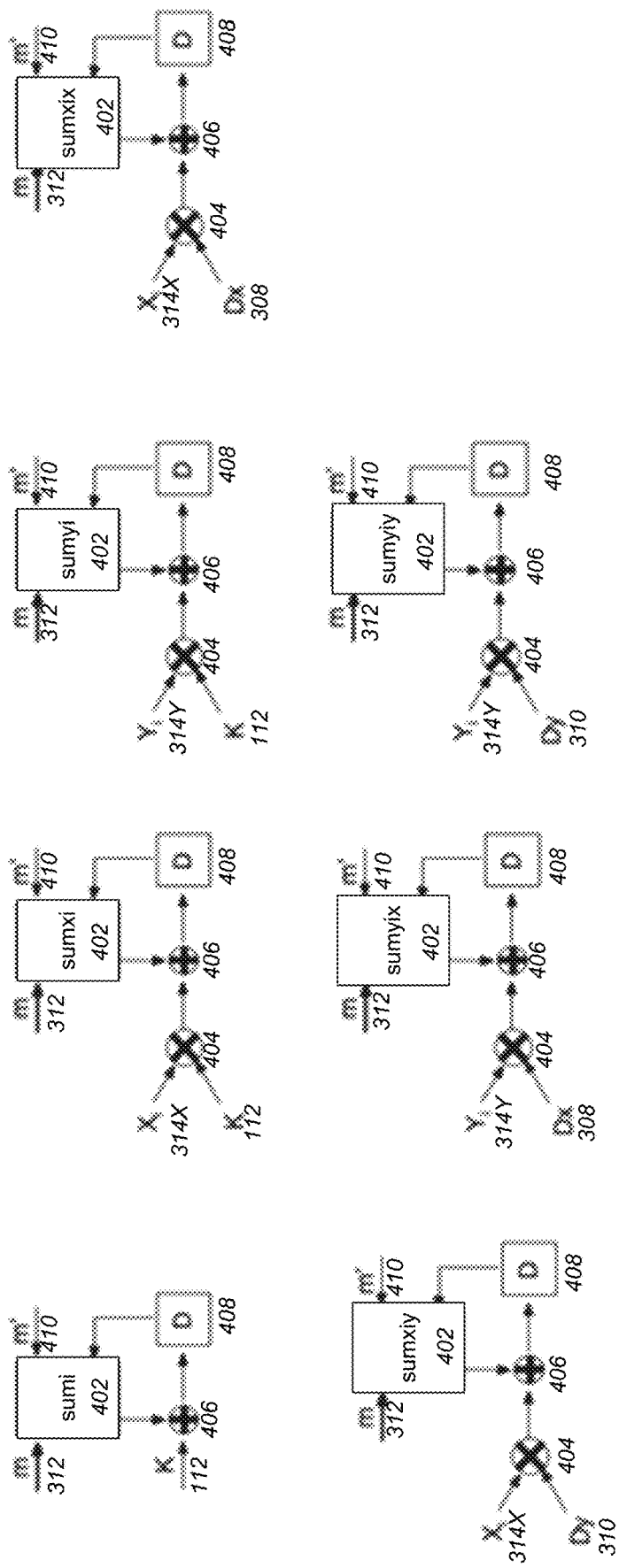
FIG. 4 illustrates an SO computation engine first stage for performing initial window summing in accordance with one or more embodiments of the invention.

The first computation engine 118 contains 3 stages. FIG. 4 illustrates the first stage which is the initial window summing based on Equation [5] in accordance with one or more embodiments of the invention. There is an accumulator 402 for each candidate radius. As the subwindow pixel values (i.e., xi 314X, yi 314Y, Dx 308, and Dy 310) arrive from the fetch engine 306, the products 404 are accumulated 406-408 into the accumulator 402 indicated by the ringmask value (m) 312 for the subwindow index returned from the ringmask rom. Each ring can later be read out by cycling through the accumulator read port (m') 406.

When the whole subwindow about the coordinate has been presented to the accumulators 402, then the final sum for each ring is computed in stage 2.

Figure 5:
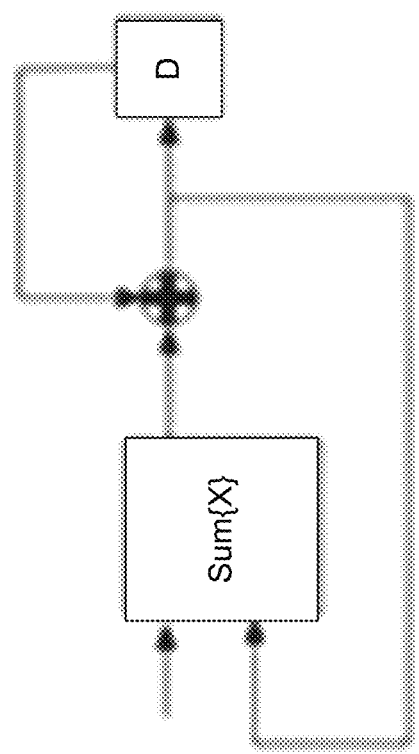
FIG. 5 illustrates the SO computation engine stage 2 for computing the final sum for each ring in accordance with one or more embodiments of the invention.

FIG. 5 illustrates the SO module stage 2 for computing the final sum for each ring in accordance with one or more embodiments of the invention. Each ring's final sum is the partial sum for that ring, and all the smaller rings before it. Stage 2 presents a ring address to Stage 1 and runs through all possible ring radii. Thus, stage 2 illustrated in FIG. 5 is repeated for each Sum{X}.

Figure 6:
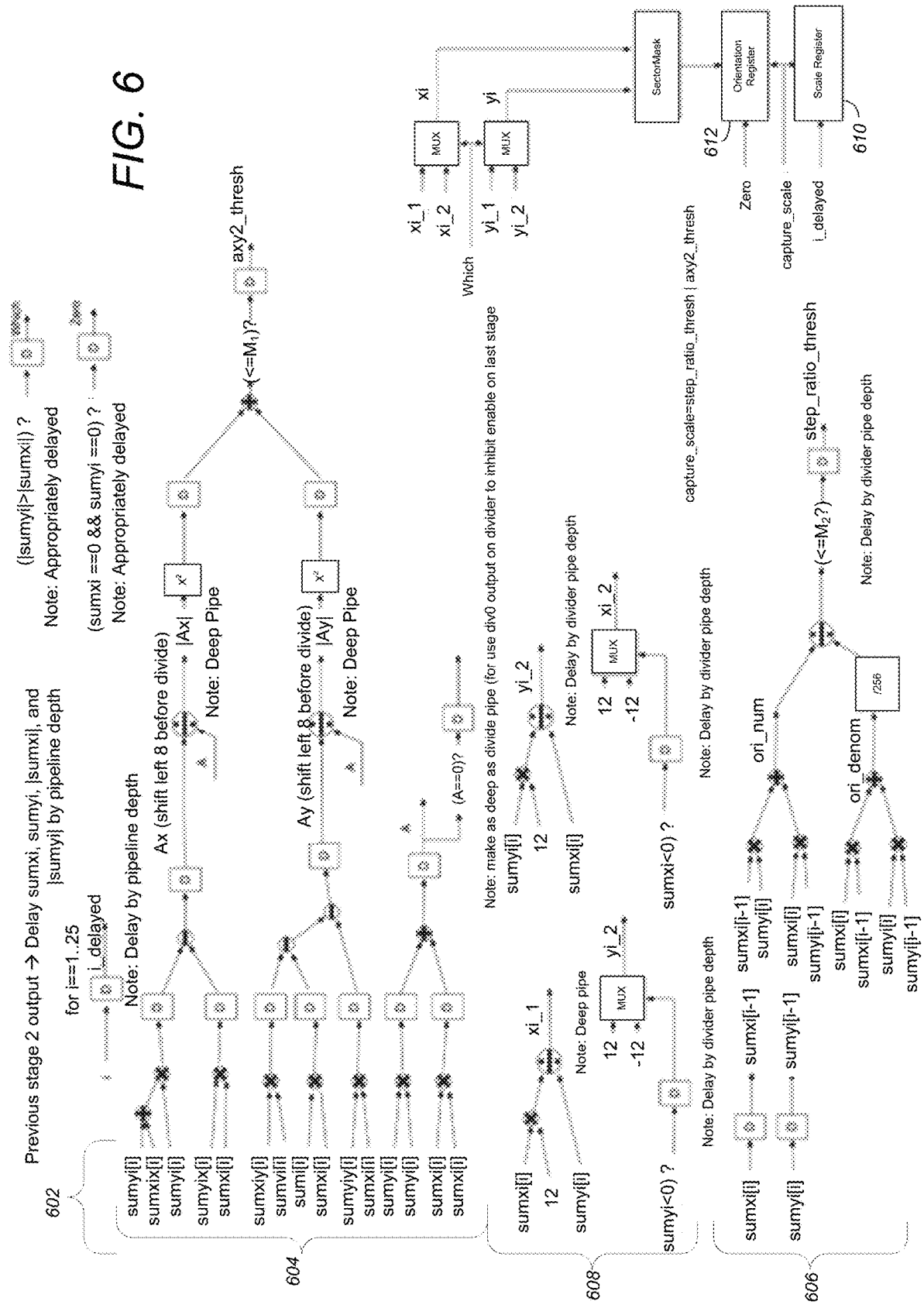
FIG. 6 illustrates the SO computation engine stage 3 for computing scale and orientation values in accordance with one or more embodiments of the invention.

When Stage 2 is complete, then Stage 3 is triggered. FIG. 6 illustrates the scale/orientation stage 3 in accordance with one or more embodiments of the invention. Stage 3 presents a ring address to stage 2 and finishes the computation and thresholding of Eq. (5) through (9) to compute a scale and orientation value. As illustrated, the outputs from stage 2 602 are used to perform the calculations of Eq. (5)-(9). Equations 5 and 6 are computed by pipeline 604 and its result is compared to the scale stability threshold, as described in equation 7. In parallel to (pipeline 604), equations 8 and 9 are computed by pipeline 606, and its output is compared to the orientation stability threshold. In parallel to pipeline 604 and pipeline 606, candidate orientations are computed by pipeline 608. When both the scale and orientation stability thresholds are met, scale and orientation for the current coordinate is successfully computed. Scale corresponds to the current ring address being processed, and orientation by the values computed by 608.

When Stage 3 is complete, its stored scale 610 and orientation 612 values are written to external memory.

Extract Descriptor (ED) Computation
Computation Description

Figure 7C:
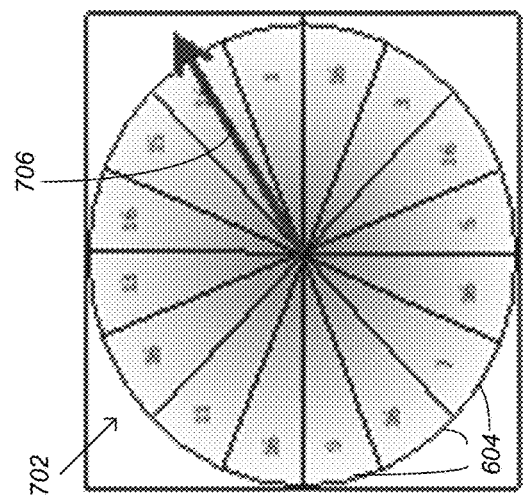
FIGS. 7A-7C illustrate descriptor extraction in accordance with one or more embodiments of the invention.
Figure 7B:
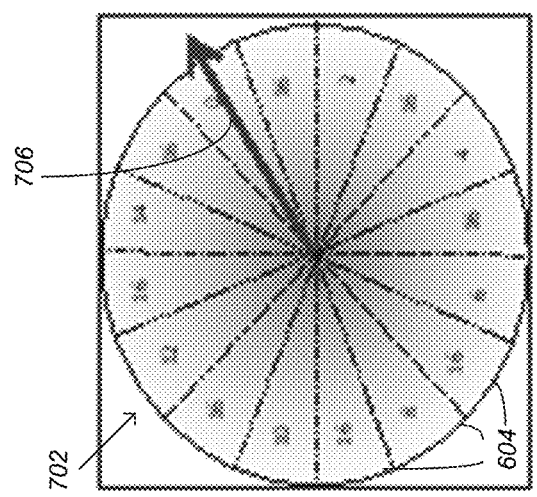
Figure 7A:
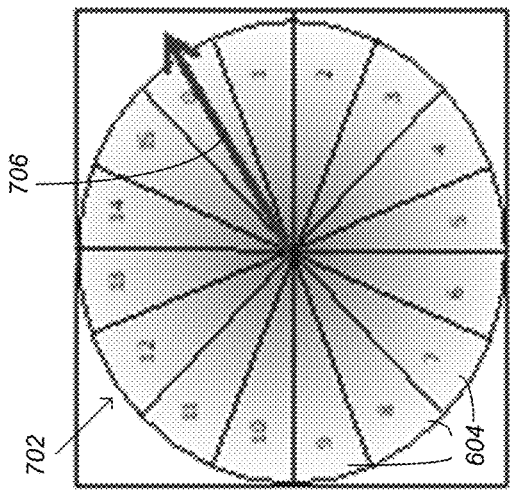

Next is to extract a descriptor for each feature. For the descriptor, embodiments of the invention may use an approach based on SURF [Bay]. FIGS. 7A-7C illustrate descriptor extraction in accordance with one or more embodiments of the invention. The circular regions 702 are centered at a feature and each region 702 is divided into 16 wedges 704. Four quantities are extracted from each wedge 704. More specifically, for each wedge 704, four quantities ($\Sigma dx$ $\Sigma dy$ $\Sigma |dx|$ $\Sigma |dy|$) are extracted. Unlike traditional SURF, which uses a 4 by 4 block, embodiments of the invention split the local area into 16 wedges 704 centered at the feature location where the circle radius is the scale r estimated from the last section. The wedge order is clockwise started at the feature orientation 706. The wedge angle for 16 wedges 704 is 22.5 degree. However, embodiments of the invention may increase this angle to 30 degrees to introduce a 3.75 degree overlap between adjacent wedges 704 in order to mitigate the effect of discretization. In view of the above, FIG. 7A illustrates 16 evenly divided wedges. Because the angle of each wedge was increased from 22.5 degrees to 30 degrees, masks were used for odd and even wedges. FIG. 7B illustrates even wedges, and FIG. 7C illustrates odd wedges).

This arrangement has a few advantages. First, it relaxes the precision requirement for orientation and scale. For example, the orientation can be precalculated as a discrete look up table which will avoid more expensive arctan operation. Second, it avoids any image transform, since the image rotation can be done by wedge index shifting.

$$dX = dx \cos(\theta_f) + dy \sin(\theta_f)$$
$$dY = -dx \sin(\theta_f) + dy\cos(\theta_f) \qquad [10]$$

Where $\theta_f$ is the wedge azimuth angle and their cosine and sine values can be calculated and stored in a look up table. Because there are 16 wedges and each wedge has 16 quantities, the total descriptor has 64 entries.

The matching algorithm is a simple Euclidean distance with a threshold. If the maximum rotation change is known, the orientation can be used to filter out those features with large orientation differences.

Module Overview

Figure 8:
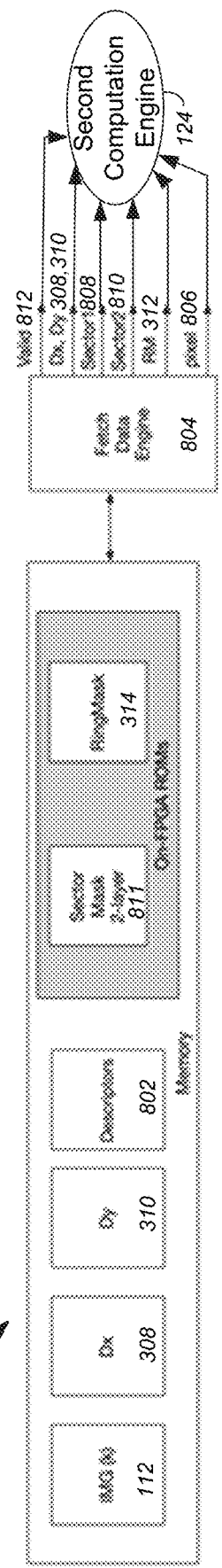
FIG. 8 illustrates an extract descriptors (ED) memory engine in accordance with one or more embodiments of the invention.

The ED module contains a memory read/write engine feeding a three-stage computation pipeline. FIG. 8 illustrates the ED memory engine 122 in accordance with one or more embodiments of the invention. The ED memory read/write engine 122 reads in coordinates (i.e., for the source image (k) 112), the Scale and Orientation value previously computed for that feature (i.e., descriptors 802), and fetches (via fetch data engine 804) a 51×51 pixel window about each coordinate from the source image 112, and Sobel DX 308/DY 310 image. It feeds those pixels 806, along with values (i.e., sector 1 808 and sector 2 810) from a sector mask 2-layer ROM 811 and ring mask ROM 314 (i.e., the on-FPGA ROMs) corresponding to the subwindow location to the second computation engine 124. In order to keep the read engine simple, the engine always reads a 51×51 pixel window from memory 314, and flags whether a pixel is of interest (i.e., sets a valid flag 812) based on the scale value and the ringmask ROM 314 for the current window index. The sector mask value is "rotated" by the incoming orientation value so that each computed descriptor is "normalized" to the same orientation to output an actual sector value to be used for the computation of the descriptor.

Figure 9:
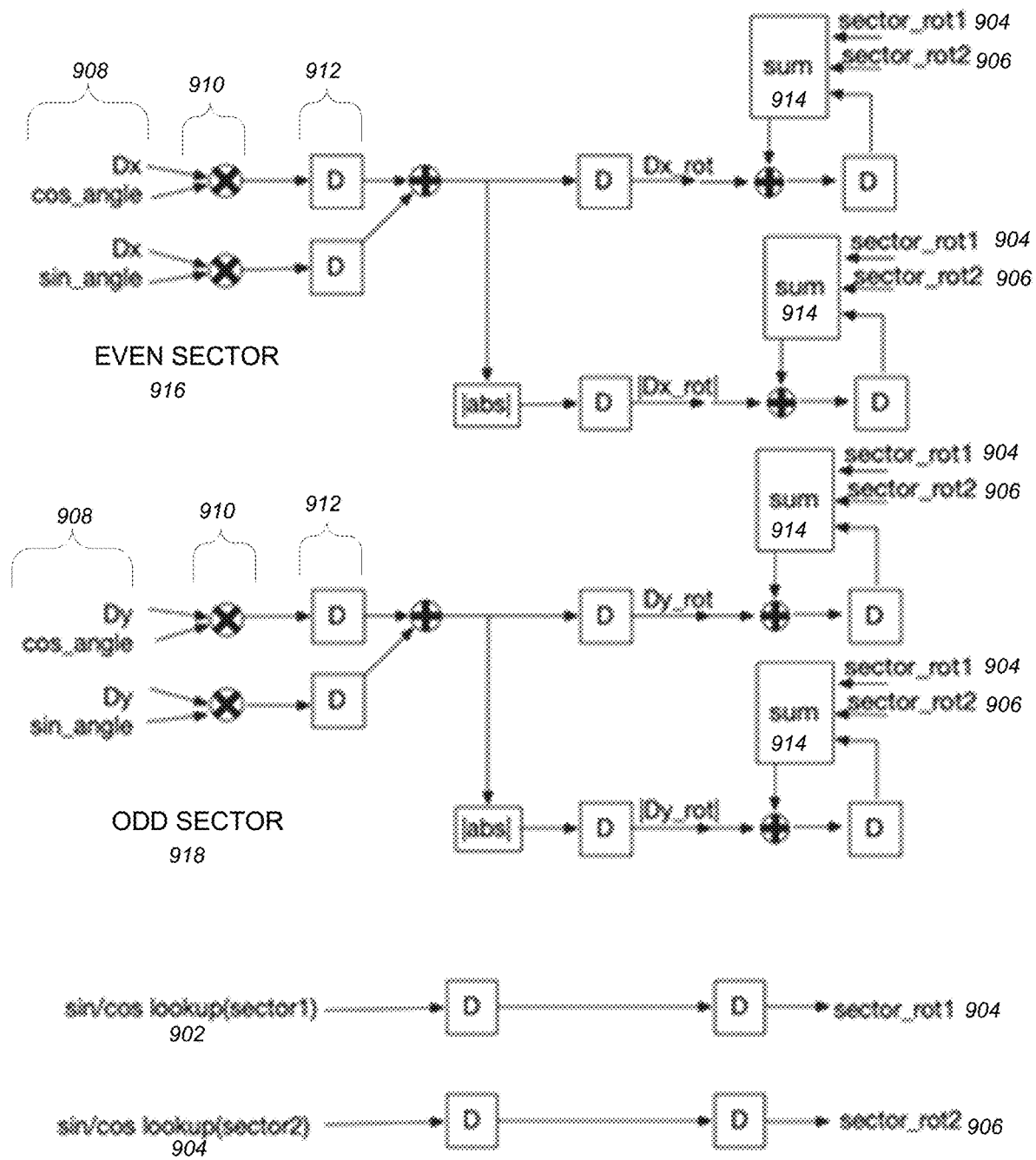
FIG. 9 illustrates an exemplary ED stage 1 in accordance with one or more embodiments of the invention.

FIG. 9 illustrates an exemplary ED stage 1 in accordance with one or more embodiments of the invention. Stage 1 of the Extract Descriptors module 120 computes the initial partial sector sums according to Eq. (10). Because there are only 16 possible sectors, it is simple enough to use a small lookup table for the trigonometric functions. In this regard, the sin/cos lookup 902 and 904 is utilized to acquire the cos value (sector_rot1 906) and sin value (sector_rot2 908) for the wedge azimuth angle representing the sector mask.

As each valid pixel 908 comes in, the current product 910 is accumulated 912 into the sums 914 for the sector indicated by the sector mask (sector_rot1 904 and sector_rot2 906). To mitigate aliasing issues, the original reference algorithm split the sector mask between even and odd sectors, and two sectors are computed for each pixel, one even sector 916, and one odd sector 918.

Figure 10:
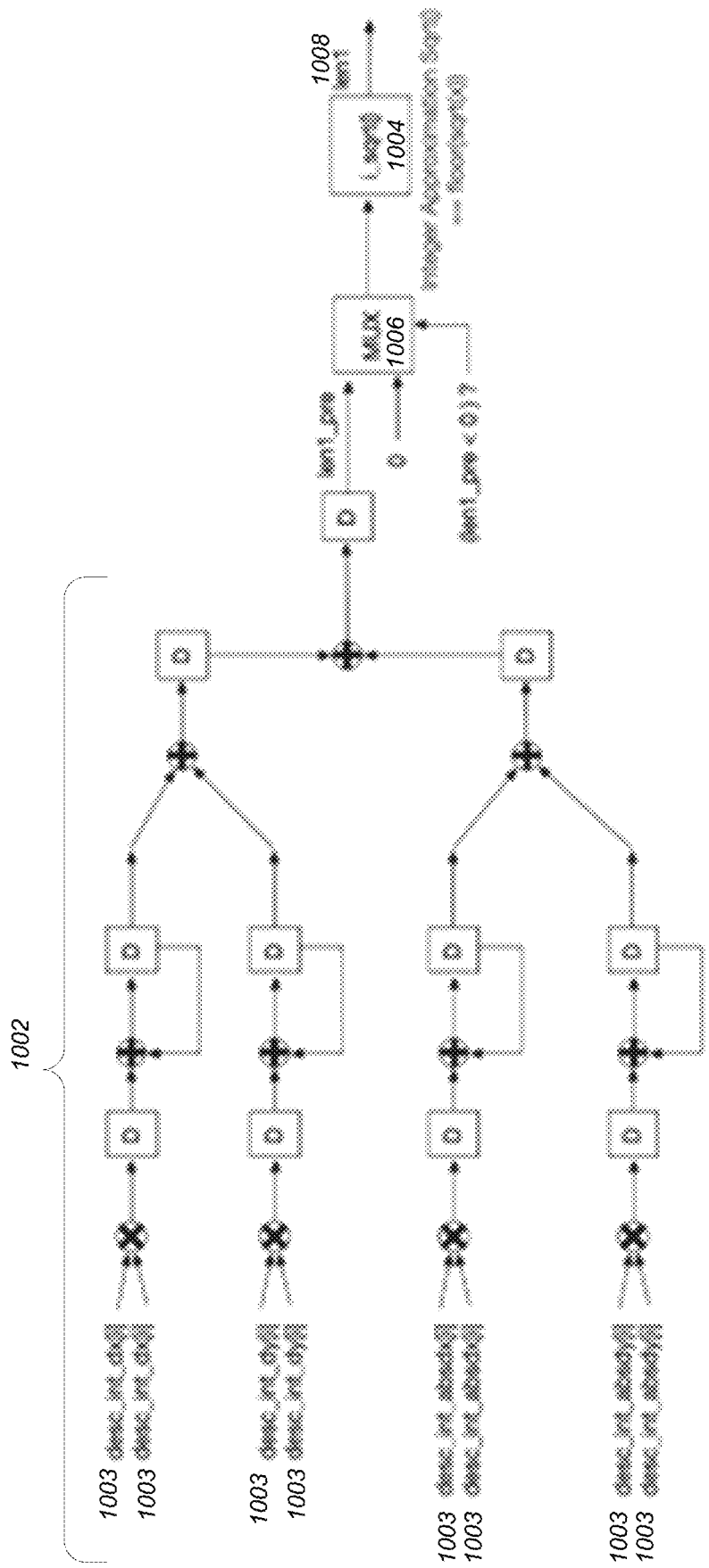
FIG. 10 illustrates an exemplary ED stage 2 in accordance with one or more embodiments of the invention.

After the intermediate sums are complete, stage 2 is performed. FIG. 10 illustrates the ED stage 2 in accordance with one or more embodiments of the invention. Stage 2 sums 1002 the entire 64-element vector of sums and outputs the square root (via sqrt functionality 1004) of the sum of sums as the first step in normalizing the vector. The multiplexor 1006 outputs a 0 or the sum (len1_pre) to the sqrt functionality 1004 depending on whether the sum (len1_pre) is negative or not. The square root used is an integer approximation square root (i.e., len1 1008) to avoid floating point representations and to simplify the logic design by fitting into the fixed-point representation used throughout the design. The integer square root is equivalent to the function $\lfloor \sqrt{x} \rfloor$. E.g. 2.0 in 16.16 fixed-point is 0x00020000 (131072). Take the $\lfloor \sqrt{x} \rfloor$ of that number, and the result is an 8.8 fixed point number 0x16A (362). 0x16A in floating point representation converted from 8.8 is 1.4140, which is an approximation of the real square-root of 2 of 1.4142. This precision is good enough/sufficient for the purposes of this computation in embodiments of the invention.

While a variety of square root methodologies may be utilized, the following code provides an exemplary integer square root methodology that may be utilized (and developed/integrated into an FPGA) in one or more embodiments of the invention:

```
unsigned int sqrt_simple(unsigned int num)
{
    unsigned int op    = num;
    unsigned int res   = 0;
    unsigned int one   = 0x40000000;
    while (one > op)
        one >>= 2;
    while (one != 0)
    {
        if (op >= res + one)
        {
            op -= res + one;
            res = (res >> 1) + one;
        }
        else
        {
            res >>= 1;
        }
        one >>= 2;
    }
    return res;
}
```

Figure 11:
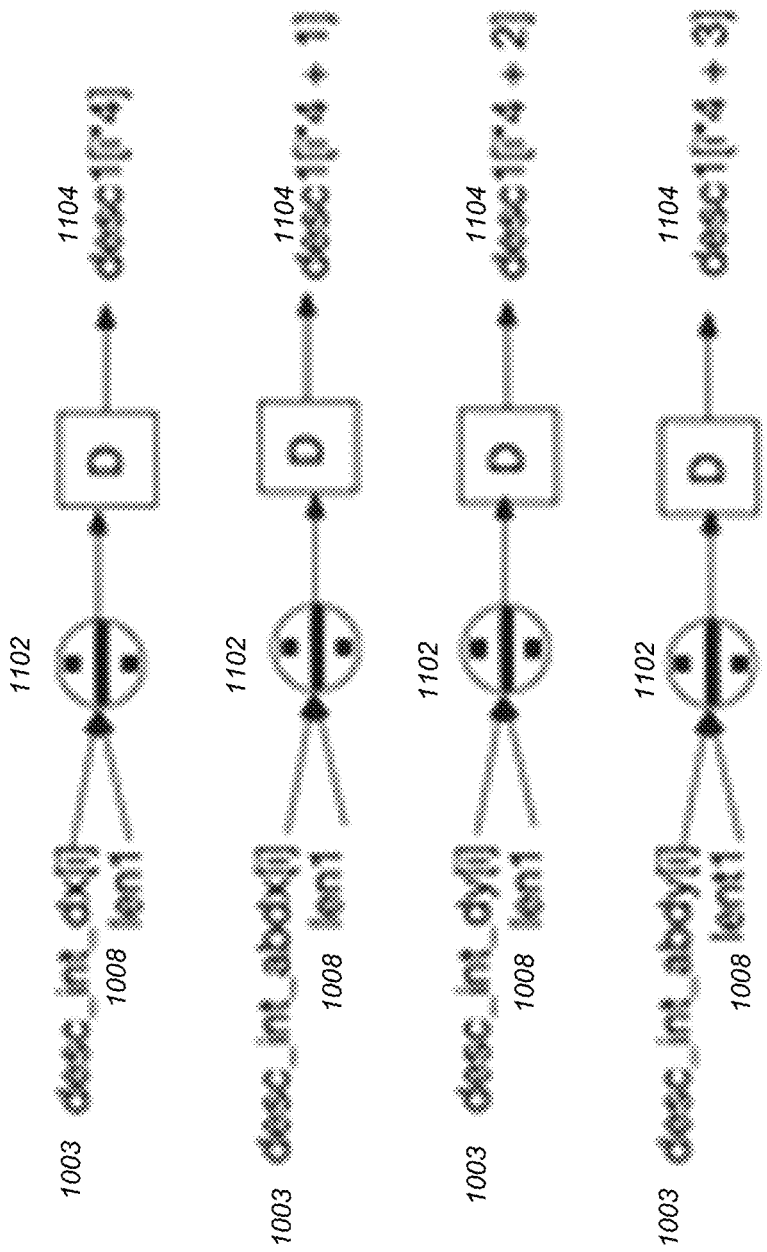
FIG. 11 illustrates an exemplary ED stage 3 in accordance with one or more embodiments of the invention.

Once stage 2 is complete, stage 3 may be performed. FIG. 11 illustrates the ED stage 3 in accordance with one or more embodiments of the invention. All the partial sums 1102 are re-read by stage 3 and divided 1102 by the vector length 1008 computed in stage 2 for the final step of normalizing the 64-element vector. At this point, the descriptor 1104 is written out to memory.

Brute Force (BF) Matcher
Computation Description

The SOSE Brute Force matcher 128 compares two sets of descriptors by finding the best match between them using the Manhattan Distance method. The output is a list of best and second-best matches of one set against the other. The computation performed by the Brute Force Matcher 128 is quite simple, only summing up an element-by-element absolute difference between a reference descriptor (r) against every descriptor (s) in an evaluation set of descriptors.

$$dist = \sum_{i=1}^{64} |r_i - s_i|$$

Module Overview

Figure 12:
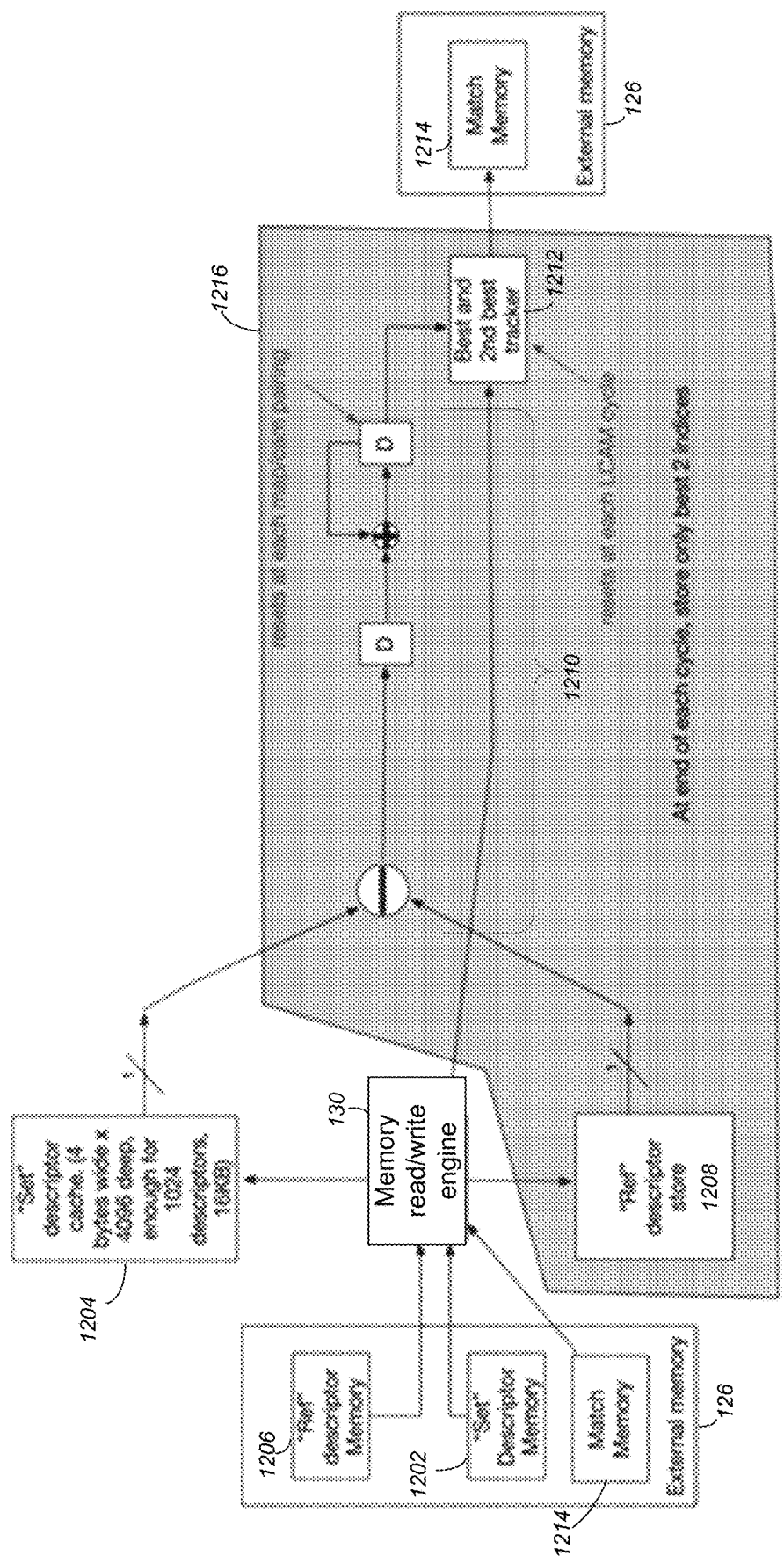
FIG. 12 illustrates a Brute Force Matcher in accordance with one or more embodiments of the invention.

FIG. 12 illustrates the Brute Force Matcher 128 in accordance with one or more embodiments of the invention. In order to speed up computation, the module (i.e., the memory read engine 130) pre-loads a set of descriptors (i.e., "Set" descriptors from "Set" descriptor memory 1202 within external memory 126 into an on-chip cache 1204, currently that cache 1204 is 1024 descriptors long. This cache 1204 is called the "set" cache. When all descriptors 1202 in the "set" list are loaded, or the "set" cache 1204 is full, the module 130 then loads (into a "Ref" descriptor store 1208) a single descriptor from the reference list of descriptors (i.e., from "Ref" descriptor memory 1206 within external memory 126). This descriptor is called the "ref" descriptor. The module then performs a Manhattan distance computation 1210 of the "ref" descriptor against every "set" descriptor in the on-board cache 1204, and keeps track of the lowest and second lowest scores 1212 seen, and their indices into the "set" array. At the completion of computing all the pairings available in the "set" cache 1204, the module 130 writes out the resultant best and second-best pairing scores 1212 and indices for that "ref" descriptor into memory (i.e., the match memory 1214 within external memory 126). It then repeats the same process for each "ref" descriptor in the list.

If there are more descriptors in the "set" list than can fit in the on-board cache 1204, the module again repeats the process described above with the next chunk of "set" descriptors, with a slight difference. The module will load the results of pairing for the previous iteration (i.e., resetting the results for each map/cam pairing), initializing the current best and second-best matches for a "ref" descriptor with the result of the previous iteration(s) (i.e., the initialization resets at each LCAM 102 [LVS Camera] cycle). The module then continues as described in the previous paragraph, starting from the first descriptor in the "ref" list. The process in this paragraph is repeated until all "set" descriptors have been processed.

In view of the above, box 1216 is the actual math/metric for comparison. In one or more embodiments, box 1216 comprises the Manhattan distance calculator. The steps performed by 1210 are a summation of a 1:1 absolute difference between each element in the "set" descriptor.

Harris Feature Detector 114 (also referred to as a Harris Corner Detector and/or Harris Module)

Figure 13:
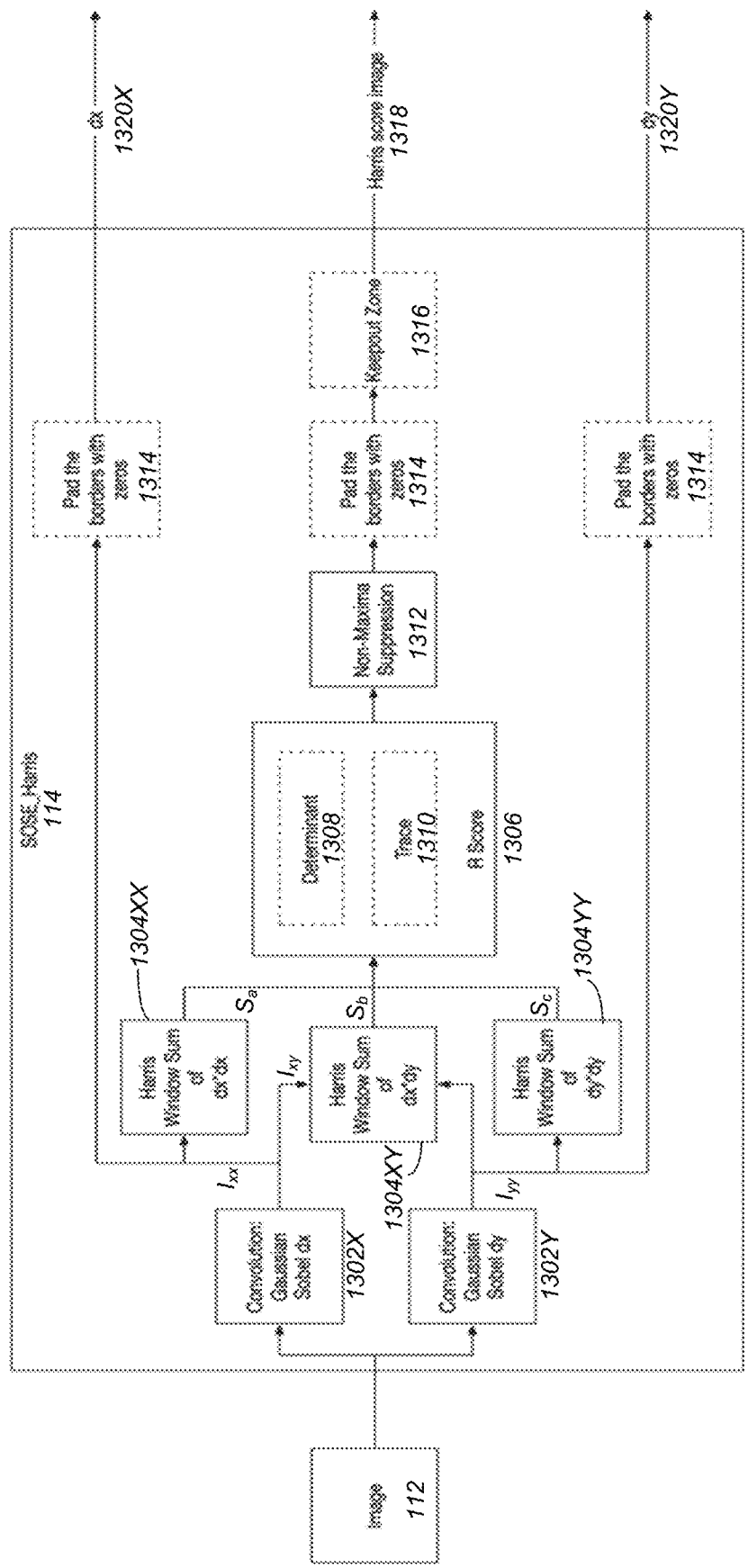
FIG. 13 shows a high level diagram of the Harris module in accordance with one or more embodiments of the invention.

The Harris feature detector 114 uses classic Harris corner detector algorithm with added non-maxima suppression. FIG. 13 shows a high-level diagram of the Harris module in accordance with one or more embodiments of the invention. The dashed lines represent algorithmic logic blocks that are not grouped into an FPGA module. Rather, they are part of the parent module logic (i.e., the module/system that contains the FPGA 106). The steps below are performed by the Harris detector 114 as set forth in FIG. 13.

Step 1: Compute X and Y Derivatives of the Image Using 5×5 Sobel*Gaussian Kernel Embodiments of the invention use the associative property of convolution to combine Gaussian smoothing and the Sobel derivative operator into one 5×5 kernel. By performing convolution 1302X and 1302Y with this kernel, one can acquire the derivative of the Gaussian smoothed image. Here is the kernel in the X direction 1302X.

$$\begin{bmatrix} 0 & 2 & 0 & -2 & 0 \\ 4 & 9 & 0 & -9 & -4 \\ 7 & 16 & 0 & -16 & -7 \\ 4 & 9 & 0 & -9 & -7 \\ 0 & 2 & 0 & -2 & 0 \end{bmatrix}$$

The Harris module 114 computes the kernel for the Y direction 1302Y by transposing the X kernel.

Step 2: Compute Products of the Derivatives

The derivative images are element wise multiplied into 3 terms that are used as input to step 3:

$$I_{xx} = dx*dx$$

$$I_{xy} = dx*dy$$

$$I_{yy} = dy*dy$$

Step 3: Compute 5×5 Window Sum of the Derivative Products

Embodiments of the invention use the same convolution module as in step 1 to compute a 5×5 window sum 1304XX, 1304XY, and 1304YY over the products in step 2. The trick is to set all kernel elements to 1s. This turns the convolution operation into a window sum operation. The synthesizer detects all multiply by one operations and optimizes the hardware by removing the multipliers. The 3 terms out of this stage are:

$$S_a = \sum_{(x,y) \in W} I_{xx}$$

$$S_b = \sum_{(x,y) \in W} I_{xy}$$

$$S_c = \sum_{(x,y) \in W} I_{yy}$$

Step 4: Compute the Response of the Detector (R Score)

The Harris corner response score, also known as R score 1306, is calculated from the M matrix according to these formulas.

$$M = \begin{bmatrix} S_a & S_b \\ S_b & S_c \end{bmatrix}$$

$$\det(M) = S_a * S_c - S_b * S_b$$

$$\text{trace}(M) = S_a + S_c$$

$$R = \max(0, \det(M) - k * \text{trace}(M)^2)$$

The constant k is usually 0.04 to 0.06. Embodiments of the invention set it to 3/64=0.0469. The max is there to zero out negative values. Embodiments may not be interested in negative scores. The determinant logic/method 1308 and trace logic/method 1310 may be computed per the formulas above.

Step 5: Compute Non-Maxima Suppression in a 3×3 Window

Non-Maxima Suppression 1312 is meant to detect local maximums. If a point is not a local maximum in a 3×3 neighborhood, embodiments of the invention zero it out. Here is an example of NMS 1312 with the threshold set to 4.

$$NMS \text{ of } \begin{bmatrix} 8 & 8 & 8 & 8 & 8 \\ 8 & 20 & 8 & 8 & 8 \\ 8 & 7 & 8 & 12 & 8 \\ 8 & 5 & 8 & 8 & 8 \\ 8 & 8 & 8 & 8 & 8 \end{bmatrix} => \begin{bmatrix} 20 & 0 & 0 \\ 0 & 0 & 12 \\ 0 & 0 & 0 \end{bmatrix}$$

The threshold requires that the locally maximum value be at least that much larger than any of its neighbors.

Step 6: Pad all Outputs with Zeros to be the Same Size as Subwindow Selected

All kernel or window-based operations output valid pixels only and use the center point as the anchor point. This results in a smaller output than the input for convolutions 1302, window sums 1304 and non-maxima suppression 1312. Embodiments of the invention pad 1314 the output/borders with zeros all around to restore this lost size. This is done to simplify indexing R score image by later stages of SOSE.

Step 7: Set all R Scores within 28 Pixels of the Borders to Zeros

In order to prevent later stages of SOSE from picking features too close to the border, embodiments of the invention may set 1316 all scores within 28 pixels of any side to 0 (referred to as the Keepout Zone).

Based on the above, steps, the Harris corner detector 114 outputs the Harris Sobel gradient image 1318 (also referred to as the Harris score and/or Harris score image) as well as the X and Y derivatives (dx 1320X and dy 1320Y).

Hardware Description

Figure 14:
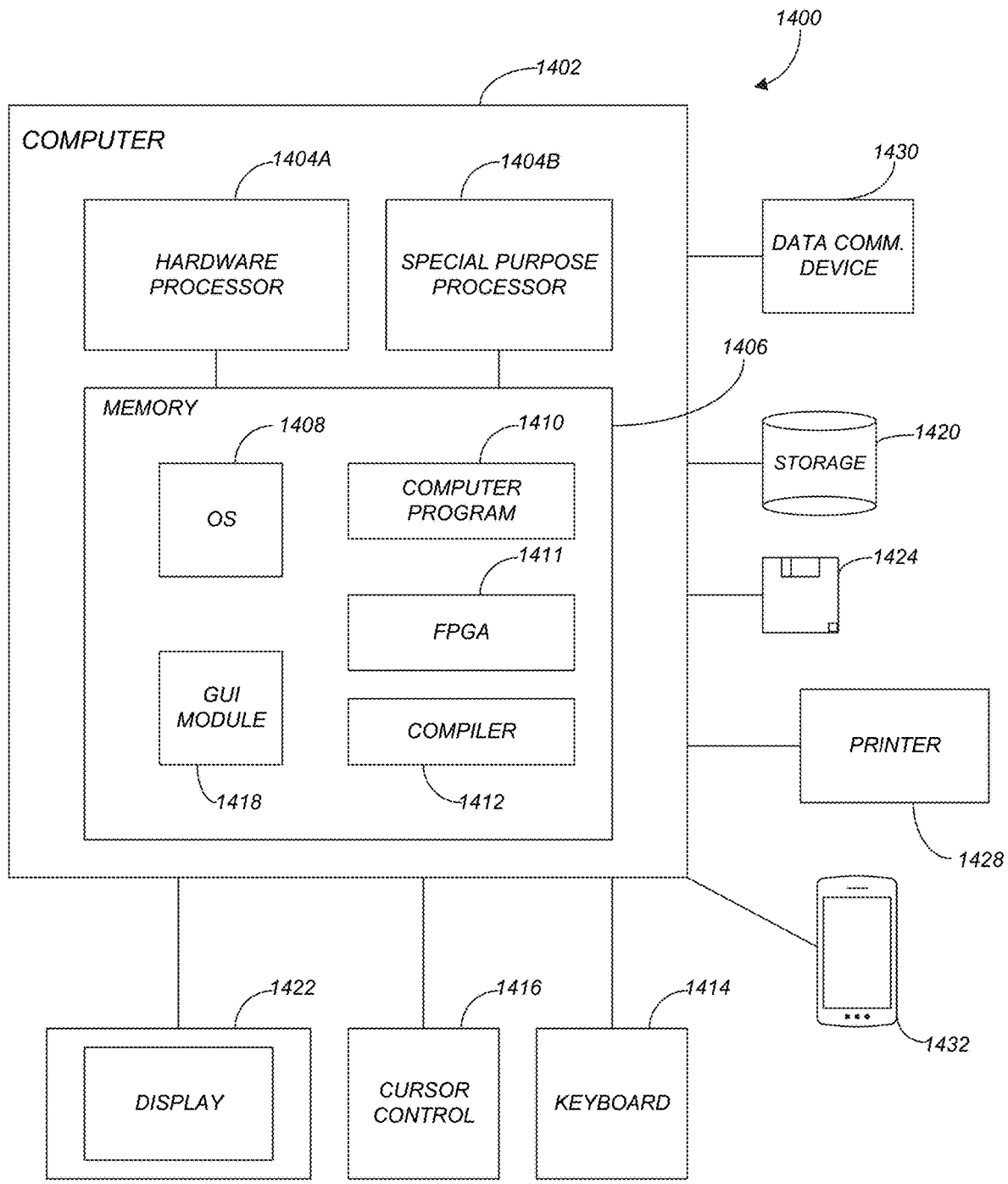
FIG. 14 is an exemplary hardware and software environment used to implement one or more embodiments of the invention.

FIG. 14 is an exemplary hardware and software environment 1400 (referred to as a computer-implemented system and/or computer-implemented method) used to implement one or more embodiments of the invention. The hardware and software environment includes a computer 1402 and may include peripherals. Computer 1402 may be a user/client computer, server computer, or may be a database computer. The computer 1402 comprises a hardware processor 1404A and/or a special purpose hardware processor 1404B (hereinafter alternatively collectively referred to as processor 1404) and a memory 1406, such as random access memory (RAM). The computer 1402 may be coupled to, and/or integrated with, other devices, including input/output (I/O) devices such as a keyboard 1414, a cursor control device 1416 (e.g., a mouse, a pointing device, pen and tablet, touch screen, multi-touch device, etc.) and a printer 1428. In one or more embodiments, computer 1402 may be coupled to, or may comprise, a portable or media viewing/listening device 1432 (e.g., an MP3 player, IPOD, NOOK, portable digital video player, cellular device, personal digital assistant, etc.). In yet another embodiment, the computer 1402 may comprise a multi-touch device, mobile phone, gaming system, internet enabled television, television set top box, or other internet enabled device executing on various platforms and operating systems.

In one embodiment, the computer 1402 operates by the hardware processor 1404A performing instructions defined by the computer program 1410 (e.g., a computer-aided design [CAD] application) under control of an operating system 1408. In alternative embodiments, the logic of the computer 1402 and/or the computer itself may be programmed/operated by a Field Programmable Gate Array (FPGA) 1411. The FPGA 1411, computer program 1410 and/or the operating system 1408 may be stored in the memory 1406 and may interface with the user and/or other devices to accept input and commands and, based on such input and commands and the instructions defined by the computer program 1410 and operating system 1408, to provide output and results.

Output/results may be presented on the display 1422 or provided to another device for presentation or further processing or action. In one embodiment, the display 1422 comprises a liquid crystal display (LCD) having a plurality of separately addressable liquid crystals. Alternatively, the display 1422 may comprise a light emitting diode (LED) display having clusters of red, green and blue diodes driven together to form full-color pixels. Each liquid crystal or pixel of the display 1422 changes to an opaque or translucent state to form a part of the image on the display in response to the data or information generated by the processor 1404 from the application of the instructions of the computer program 1410 and/or operating system 1408 to the input and commands. The image may be provided through a graphical user interface (GUI) module 1418. Although the GUI module 1418 is depicted as a separate module, the instructions performing the GUI functions can be resident or distributed in the operating system 1408, the computer program 1410, or implemented with special purpose memory and processors.

In one or more embodiments, the display 1422 is integrated with/into the computer 1402 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 1402 according to the computer program 1410 instructions may be implemented in a special purpose processor 1404B. In this embodiment, some or all of the computer program 1410 instructions may be implemented via firmware instructions stored in a read only memory (ROM), a programmable read only memory (PROM) or flash memory within the special purpose processor 1404B or in memory 1406. The special purpose processor 1404B may also be hardwired through circuit design to perform some or all of the operations to implement the present invention. Further, the special purpose processor 1404B may be a hybrid processor, which includes dedicated circuitry for performing a subset of functions, and other circuits for performing more general functions such as responding to computer program 1410 instructions. In one embodiment, the special purpose processor 1404B is an application specific integrated circuit (ASIC) and/or an FPGA.

The computer 1402 may also implement a compiler 1412 that allows an application or computer program 1410 written in a programming language such as C, C++, Assembly, SQL, PYTHON, PROLOG, MATLAB, RUBY, RAILS, HASKELL, or other language to be translated into processor 1404 readable code. Alternatively, the compiler 1412 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1410 accesses and manipulates data accepted from I/O devices and stored in the memory 1406 of the computer 1402 using the relationships and logic that were generated using the compiler 1412.

The computer 1402 also optionally comprises an external communication device such as a modem, satellite link, Ethernet card, or other device for accepting input from, and providing output to, other computers 1402.

In one embodiment, instructions implementing the operating system 1408, the computer program 1410, and the compiler 1412 are tangibly embodied in a non-transitory computer-readable medium, e.g., data storage device 1420, which could include one or more fixed or removable data storage devices, such as a zip drive, floppy disc drive 1424, hard drive, CD-ROM drive, tape drive, etc. Further, the operating system 1408 and the computer program 1410 are comprised of computer program 1410 instructions which, when accessed, read and executed by the computer 1402, cause the computer 1402 to perform the steps necessary to implement and/or use the present invention or to load the program of instructions into a memory 1406, thus creating a special purpose data structure causing the computer 1402 to operate as a specially programmed computer executing the method steps described herein. Computer program 1410 and/or operating instructions may also be tangibly embodied in memory 1406 and/or data communications devices 1430, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1402.

CONCLUSION

This concludes the description of the preferred embodiment of the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[Lowe] David G. Lowe, "Distinctive image features from scale-invariant key points," *International Journal of Computer Vision*, 60, 2 (2004), pp. 91-110.

[Rosin] P. L. Rosin. Measuring corner properties. *Computer Vision and Image Understanding* 73(2):291-307, 1999.

[Bay] Bay, H., Tuytelaars, T., Van Gool, L. (2006). SURF: Speeded Up Robust Features. In: Leonardis, A., Bischof, H., Pinz, A. (eds) Computer Vision—ECCV 2006. ECCV 2006. Lecture Notes in Computer Science, vol 3951. Springer, Berlin, Heidelberg. https://doi.org/10.1007/11744023_32.

[Koenderink] Koenderink, J. K, 1984. The structure of images. Biological Cybernetics, 50:363-396.

[Lindeberg] Lindeberg, T. 1994. Scale-space theory: A basic tool for analyzing structures at different scales. Journal of Applied Statistics, 21(2):224-270.

[Mikolajcyk] Mikolajcyk, K., and Schmidt, C. 2002. An affine invariant interest point detector. ECCV 2002, Copenhagen, Denmark, pp. 128-142.

[Rublee] Rublee, E., et al., "ORB: An efficient alternative to SIFT or SURF," ICCV 2011, pp. 2564-2571.

[Alcantarilla] Alcantarilla, P. F., Bartoli, A, and Davison, A. J., "KAZE Features," ECCV 2012, pp. 214-227.

[Mikolajczyk2] Krystian Mikolajczyk and Cordelia Schmid. Scale and invariant interest point detectors. IJCV, 60(1): 63-86, 2004.

[Owens] Chris Owens, et al., "Development of a Signature-based Terrain Relative Navigation System for Precision Landing," AIAA 2021-0376. *AIAA Scitech* 2021 *Forum.* January 2021.

[Agrawal] M. Agrawal, K. Konolige, and M. R. Blas, "CenSurE: Center surround extremas for real time feature detection and matching", Lecture Notes in Computer Science, vol. 5305, 2008, pp. 102-115.

What is claimed is:

1. A system implemented in a hardware circuit for descriptor-based feature matching during terrain relative navigation (TRN) comprising:
   (a) a scale and orientation module comprising:
      (i) a first memory read/write engine that feeds a first multi-stage computation pipeline wherein the first memory read/write engine:
         (1) reads in image coordinates for a source image captured by a camera from a vehicle above a terrain of a scene;
         (2) fetches an image pixel window from the source image around each of the image coordinates;
         (3) fetches a slope pixel window from a slope image around each of the image coordinates, wherein the slope image is generated by a Harris corner detector, wherein the slope image is based on the source image;
         (4) fetches a ring mask from a read only memory (ROM); and
         (5) feeds the image pixel window, the slope pixel window, and the ring mask value to a first computation engine;
      (ii) the first computation engine performing a plurality of primary stages in parallel in a pipeline fashion, wherein:
         (1) a first primary stage of the plurality of primary stages comprises:
            (A) combining corresponding pixels from the image pixel window and the slope pixel window with subwindow coordinates to generate intermediate values for each subwindow coordinate; and
            (B) accumulating the intermediate values into ring accumulators based on the ring mask;
         (2) a second primary stage of the plurality of primary stages comprises:
            (A) reading the accumulated intermediate values from the ring accumulators; and
            (B) summing the accumulated intermediate values for each ring accumulator to generate a final ring value for each ring accumulator;
         (3) a third primary stage of the plurality of primary stages comprises multiple computations performed in parallel, and all of the computations are of a same latency, wherein:
            (A) each computation is utilized to determine an orientation stability measure for each ring accumulator;
            (B) each orientation stability measure is used to determine a final scale value and a final orientation value based on a threshold for the orientation stability measure;
            (C) the final scale value is based on a first inner ring accumulator of the ring accumulators where the threshold was met; and
            (D) the final orientation value is based on the accumulated intermediate values corresponding to the first inner ring accumulator where the threshold was met; and
            (4) the final scale value and final orientation value are written in the first memory read/write engine;
   (b) an extract descriptors (ED) module comprising:
      (i) a second memory read/write engine that feeds a second multi-stage computation pipeline, wherein the second memory read/write engine:
         (1) reads in the image coordinates for the source image captured by the camera from the vehicle above the terrain of the scene;
         (2) fetches the image pixel window from the source image around each of the image coordinates;
         (3) fetches the slope pixel window from the slope image around each of the image coordinates, wherein the slope image is generated by the Harris corner detector, wherein the slope image is based on the source image;
         (4) reads the final scale value and the final orientation value for each of the image coordinates from external memory wherein the final scale value and the final orientation value were generated by the scale and orientation module;
         (5) fetches sector values and a ring mask value from the ring mask from the read only memory (ROM);
         (6) feeds the image pixel window, the slope pixel window, the sector values, the ring mask value, the final scale value, and the final orientation value to a second computation engine;
         (7) identifies pixels of interest based on the final scale value and the ring mask value for a current image coordinate of the image coordinates; and
         (8) reorients the sector values based on the final scale value and the final orientation value; and
      (ii) the second computation engine performing two or more secondary stages in parallel in a pipeline fashion, wherein:
         (1) a first secondary stage of the two or more secondary stages comprises:
            (A) combining corresponding pixels from the image pixel window and the slope pixel window with subwindow coordinates to generate intermediate values for each subwindow coordinate; and
            (B) accumulating the intermediate values into sector accumulators associated with the reoriented sector values; and
         (2) additional secondary stages of the two or more secondary stages comprise:
            (A) normalizing the intermediate values in the sector accumulators to generate an image feature descriptor per coordinate; and
            (B) writing the image feature descriptors into external memory; and
   wherein the image feature descriptors are used to perform the feature matching during the terrain relative navigation (TRN).

2. The system of claim 1, wherein:
the normalizing is based on an integer square root to calculate a vector length of an n-dimensional vector based on the intermediate values in the sector accumulators.

3. The system of claim 1, further comprising:
a navigation controller that navigates the vehicle based on the feature mapping during TRN.

4. The system of claim 1, further comprising:
(c) a Brute Force (BF) Matcher comprising:
   (i) a third memory read/write engine that:
      (1) pre-loads a set of map feature descriptors from the image feature descriptors into an on-chip cache;
      (2) loads a single reference image feature descriptor generated from the source image on a per inner loop cycle;
      (3) waits until the on-chip cache is full or the set of map feature descriptors is exhausted; and
      (4) waits for a comparator to complete a comparison for the inner loop cycle for all map feature descriptors in the set; and
   (ii) the comparator that:
      (1) compares the single reference image feature descriptor to the set of map feature descriptors that are in the on-chip cache to determine a result, wherein the result comprises a correspondence between the single reference image feature descriptor and the map feature descriptors in the set of map feature descriptors; and
      (2) writes the result to the external memory.

5. The system of claim 4, wherein the comparator compares the single reference image feature descriptor to the set of map feature descriptors based on Manhattan distance based on a summation of absolute differences.

6. The system of claim 4, wherein the comparator further performs an outer loop cycle by:
   triggering the third memory read/write engine to read the result for the single reference image feature descriptor;
   triggering the third memory read/write engine to load another single reference image feature descriptor and repeating the compare using the another single reference image feature descriptor and the set to generate a new result;
   combining the result and the new result; and
   writing the combined results to the external memory.

7. The system of claim 1, wherein the Harris corner detector:
   computes X and Y derivatives of the source image;
   computes multiple products of the derivatives;
   computes a window sum of the multiple products;
   computes a Harris corner response score of the Harris corner detector (R Score), wherein the R Score comprises multiple R score values based on the window sum of the multiple products;
   computes a non-maxima suppression within a predefined window to detect a local maximum, wherein the local maximum is utilized to select feature coordinates;
   pads the X and Y derivatives and the R score with zeros to be a same size as the source image;
   sets the R score values within a predefined pixel range of a border of the R score to zero; and
   outputs the slope image, wherein the slope image comprises the X and Y derivatives and the R score.

8. The system of claim 7, wherein:
   the Harris corner detector computes the X and Y derivatives using a Sobel*Gaussian kernel.

9. The system of claim 7, wherein:
   the Harris corner detector computes the window sum of the multiple products utilizing a preexisting module with a multiplier set to 1;
   the preexisting module turns a convolution operation into a window sum operation that computes the window sum; and
   a synthesizer removes the multiplier.

10. The system of claim 7, wherein:
    only a Harris corner response score that is positive is utilized to determine corners.

11. A method implemented by a hardware circuit for descriptor-based feature matching during terrain relative navigation (TRN) comprising:
(a) feeding, via a scale and orientation module, a first multi-stage computation pipeline wherein the feeding comprises:
   (i) reading in image coordinates for a source image captured by a camera from a vehicle above a terrain of a scene;
   (ii) fetching an image pixel window from the source image around each of the image coordinates;
   (iii) fetching a slope pixel window from a slope image around each of the image coordinates, wherein the slope image is generated by a Harris corner detector, wherein the slope image is based on the source image;
   (iv) fetching a ring mask from a read only memory (ROM); and
   (v) feeding the image pixel window, the slope pixel window, and the ring mask value to a first computation engine of the scale and orientation module;
(b) the first computation engine performing a plurality of primary stages in parallel in a pipeline fashion, wherein:
   (i) a first primary stage of the plurality of primary stages comprises:
      (1) combining corresponding pixels from the image pixel window and the slope pixel window with subwindow coordinates to generate intermediate values for each subwindow coordinate; and
      (2) accumulating the intermediate values into ring accumulators based on the ring mask;
   (ii) a second primary stage of the plurality of primary stages comprises:
      (1) reading the accumulated intermediate values from the ring accumulators; and
      (2) summing the accumulated intermediate values for each ring accumulator to generate a final ring value for each ring accumulator;
   (iii) a third primary stage of the plurality of primary stages comprises multiple computations performed in parallel, and all of the computations are of a same latency, wherein:
      (1) each computation is utilized to determine an orientation stability measure for each ring accumulator;
      (2) each orientation stability measure is used to determine a final scale value and a final orientation value based on a threshold for the orientation stability measure;
      (3) the final scale value is based on a first inner ring accumulator of the ring accumulators where the threshold was met;
      (4) the final orientation value is based on the accumulated intermediate values corresponding to the first inner ring accumulator where the threshold was met; and
      (5) the final scale value and final orientation value are written in a first memory read/write engine;
(c) feeding, via an extract descriptors (ED) module, a second multi-stage computation pipeline, wherein the feeding comprises:

(i) reading in the image coordinates for the source image captured by the camera from the vehicle above the terrain of the scene;
(ii) fetching the image pixel window from the source image around each of the image coordinates;
(iii) fetching the slope pixel window from the slope image around each of the image coordinates, wherein the slope image is generated by the Harris corner detector, wherein the slope image is based on the source image;
(iv) reading the final scale value and the final orientation value for each of the image coordinates from external memory wherein the final scale value and the final orientation value were generated by the scale and orientation module;
(v) fetching sector values and a ring mask value from the ring mask from the read only memory (ROM);
(vi) feeding the image pixel window, the slope pixel window, the sector values, the ring mask value, the final scale value, and the final orientation value to a second computation engine of the ED module;
(vii) identifying pixels of interest based on the final scale value and the ring mask value for a current image coordinate of the image coordinates; and
(viii) reorienting the sector values based on the final scale value and the final orientation value; and
(d) the second computation engine, in the ED module, performing two or more secondary stages in parallel in a pipeline fashion, wherein:
(i) a first secondary stage of the two or more secondary stages comprises:
(1) combining corresponding pixels from the image pixel window and the slope pixel window with subwindow coordinates to generate intermediate values for each subwindow coordinate; and
(2) accumulating the intermediate values into sector accumulators associated with the reoriented sector values; and
(ii) additional secondary stages of the two or more secondary stages comprise:
(1) normalizing the intermediate values in the sector accumulators to generate an image feature descriptor per coordinate; and
(2) writing the image feature descriptors into external memory; and
(e) utilizing the image feature descriptors to perform the feature matching during the terrain relative navigation (TRN).

12. The method of claim 11, wherein:
the normalizing is based on an integer square root to calculate a vector length of an n-dimensional vector based on the intermediate values in the sector accumulators.

13. The method of claim 11, further comprising:
navigating the vehicle based on the feature mapping during TRN.

14. The method of claim 11, further comprising:
pre-loading a set of map feature descriptors from the image feature descriptors into an on-chip cache;
loading a single reference image feature descriptor generated from the source image on a per inner loop cycle;
waiting until the on-chip cache is full or the set of map feature descriptors is exhausted;
waiting for a comparator to complete a comparison for the inner loop cycle for all map feature descriptors in the set;
comparing the single reference image feature descriptor to the set of map feature descriptors that are in the on-chip cache to determine a result, wherein the result comprises a correspondence between the single reference image feature descriptor and the map feature descriptors in the set of map feature descriptors; and
writing the result to the external memory.

15. The method of claim 14, wherein comparing the single reference image feature descriptor to the set of map feature descriptors is based on Manhattan distance based on a summation of absolute differences.

16. The method of claim 14, further comprising an outer loop cycle comprising:
reading the result for the single reference image feature descriptor;
loading another single reference image feature descriptor and repeating the comparing using the another single reference image feature descriptor and the set to generate a new result;
combining the result and the new result; and
writing the combined results to the external memory.

17. The method of claim 11, wherein the Harris corner detector:
computes X and Y derivatives of the source image;
computes multiple products of the derivatives;
computes a window sum of the multiple products;
computes a Harris corner response score of the Harris corner detector (R Score), wherein the R Score comprises multiple R score values based on the window sum of the multiple products;
computes a non-maxima suppression within a predefined window to detect a local maximum, wherein the local maximum is utilized to select feature coordinates;
pads the X and Y derivatives and the R score with zeros to be a same size as the source image;
sets the R score values within a predefined pixel range of a border of the R score to zero; and
outputs the slope image, wherein the slope image comprises the X and Y derivatives and the R score.

18. The method of claim 17, wherein:
the Harris corner detector computes the X and Y derivatives using a Sobel*Gaussian kernel.

19. The method of claim 17, wherein:
the Harris corner detector computes the window sum of the multiple products utilizing a preexisting module with a multiplier set to 1;
the preexisting module turns a convolution operation into a window sum operation that computes the window sum; and
a synthesizer removes the multiplier.

20. The method of claim 17, wherein:
only a Harris corner response score that is positive is utilized to determine corners.

* * * * *

UNITED STATES PATENT AND TRADEMARK OFFICE
CERTIFICATE OF CORRECTION

| | | |
|---|---|---|
| PATENT NO. | : 12,367,610 B2 | Page 1 of 1 |
| APPLICATION NO. | : 18/158721 | |
| DATED | : July 22, 2025 | |
| INVENTOR(S) | : Carlos Young Villalpando and Ashot Hambardzumyan | |

It is certified that error appears in the above-identified patent and that said Letters Patent is hereby corrected as shown below:

In the Specification

Column 1, Lines 22-23, delete "which issued Mar. 4, 2025 as U.S. Pat. No. 12,242,833"

Signed and Sealed this
Twenty-sixth Day of August, 2025

Coke Morgan Stewart
*Acting Director of the United States Patent and Trademark Office*